(12) United States Patent
Clark et al.

(10) Patent No.: US 10,936,176 B1
(45) Date of Patent: Mar. 2, 2021

(54) SYSTEMS AND METHODS FOR INTERACTIVE MAPS

(71) Applicant: United Services Automobile Association (USAA), San Antonio, TX (US)

(72) Inventors: John D. Clark, Boerne, TX (US); Jess W. Gingrich, San Antonio, TX (US); Kristina Tomasetti, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/194,127

(22) Filed: Nov. 16, 2018

Related U.S. Application Data

(60) Provisional application No. 62/587,850, filed on Nov. 17, 2017.

(51) Int. Cl.
*G06F 3/0484* (2013.01)
*G06F 3/0481* (2013.01)
*G06F 3/0486* (2013.01)
*G06T 11/60* (2006.01)

(52) U.S. Cl.
CPC ........ *G06F 3/04845* (2013.01); *G06F 3/0486* (2013.01); *G06F 3/04817* (2013.01); *G06T 11/60* (2013.01); *G06T 2200/24* (2013.01)

(58) Field of Classification Search
CPC .... G06F 3/0484; G06F 3/0486; G06F 3/0481; G06F 3/04817
See application file for complete search history.

(56) References Cited

U.S. PATENT DOCUMENTS

2007/0176932 A1* 8/2007 Salmre .................. G06T 3/0081
345/440
2013/0174087 A1* 7/2013 Chen ..................... G06F 3/0488
715/800

\* cited by examiner

*Primary Examiner* — Andrea C Leggett
(74) *Attorney, Agent, or Firm* — BakerHostetler

(57) ABSTRACT

An interactive map may comprise image data associated with an area. First image data and second image data may comprise an indication of a subsection of the area at different times. At least a portion of the first image data and second image data may be output via the interactive map. The subsection of the area in the first image data and in the second image data may be output at corresponding positions. The interactive map may comprise an interactive icon. A user input may be received, via the interactive map, indicative of a movement of the interactive icon. Responsive to the user input, a part of the first image data or the second image data may be revealed and a part of the second image data or the first image data may be obscured in a direction corresponding to a direction of the movement of the interactive icon.

20 Claims, 6 Drawing Sheets

SYSTEMS AND METHODS FOR INTERACTIVE MAPS

CROSS-REFERENCE TO RELATED APPLICATION

This patent claims priority to and the benefit of provisional patent application 62/587,850 which is incorporated herein by reference in its entirety.

BACKGROUND

Leaving a home unattended for any period of time can be a cause for unease. The anxiety is multiplied when the home is vacated due to a disaster, whether man-made or natural. While evacuation of the home may be unavoidable, knowledge of the state of the home may provide some peace of mind.

SUMMARY

An interactive map system may enable a user to remotely monitor a home and determine if the home has been damaged. The interactive map system may allow service providers to determine the extent of damage to the home or the need for emergency response to a particular location, without going on-site. Generating the interactive map system may comprise generating image data associated with an area at different times. Image processing may be used to determine a section of first image data generated at a first time and a section of second image data generated at a second time. An interactive map may be output comprising a portion of the first image data and a portion of the second image data. The section of the first image data may be output at a position on the interactive map corresponding to a position of the section of the second image data.

The interactive map may comprise an interactive icon. A user input may be received via the interactive map. The user input may be indicative of an interaction with the interactive icon. Based on the user input, a different portion of the first image data or the second image data may be caused to be output.

A user device may access an interactive map interface. The interface may comprise an interactive icon. The interface may comprise data associated with an area. The interface may comprise first data and second data generated at different times. A user input indicative of a movement of the interactive icon may be received. Based on the user input, an indication of the movement may be input. A dynamically modified view of image data of the interactive map interface may be received. The dynamically modified view of the first image data may comprise a portion of the second image data revealed and a portion of the first image data obscured in a direction of the movement of the interaction icon when the interactive icon is moved in a first direction. The dynamically modified view of image data may comprise the portion of the second image data obscured and the portion of the first image data revealed in the direction of the movement of the interactive icon when the interactive icon is moved in a second direction.

BRIEF DESCRIPTION OF THE DRAWINGS

The following drawings illustrate generally, by way of example, but not by way of limitation, various examples discussed in the present disclosure. In the drawings.

DETAILED DESCRIPTION

An interactive map system may enable a user to remotely monitor a home and determine if the home has been damaged. The interactive map system may allow service providers to determine the extent of damage to the home or the need for emergency response to a particular location, without going on-site. However, existing technologies fall short of providing comprehensive information regarding the status of the home. For example, the technologies do not provide real-time updates. The technologies provide images of the home from limited views, such as from only a ground-level view or only an aerial view. The technologies are not equipped to operate during disasters, such as in extreme conditions. Further, the existing technology does not indicate damage or the extent of damage to the home. As an illustrative example, a homeowner may struggle, when viewing an aerial photo of a home, to identify damage to a roof of the home. The homeowner may find that, based on her own recollection, she cannot determine whether the damage was pre-existing or whether the damage occurred since the homeowner last left the home.

The interactive map system may comprise imagery of the home, such as aerial imagery or video. The imagery may comprise images of the home at different times. The images of the home at different times may be displayed such that common points of the home in the images are aligned, overlapped, or are juxtaposed. The interactive map system may comprise one or more interactive icons. In response to interaction with the interactive icon, the view of the images of the home may dynamically change. For example, an image of the home at a later time may be dynamically overlayed on an image of the home at an earlier time.

A user may access an interactive map system to remotely monitor an area. For example, a homeowner may evacuate a hometown in anticipation of a natural disaster. While away, the homeowner may access the interactive map interface to watch over a home and determine if the home has been damaged. As another example, a repair services provider or insurance provider may use the interactive map interface to determine if the area has been damaged and to determine the extent of the damage. As yet another example, an emergency service provider may use the interactive map system to determine damage to the area and to determine where assistance is needed. The interactive map system may eliminate the need for service providers to physically enter the area.

Figure 1:
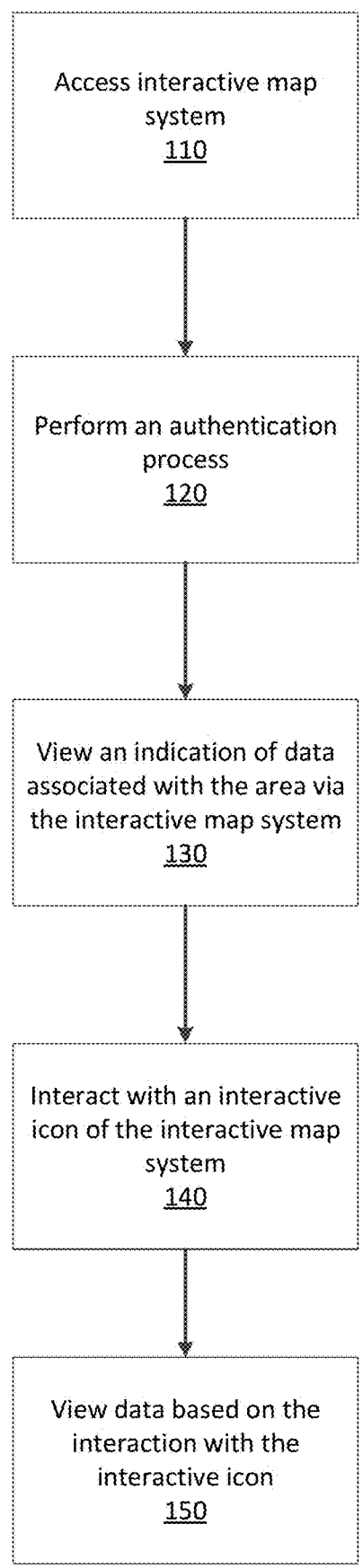
FIG. 1 shows an example method.

Referencing step 110 of FIG. 1, a user may access the interactive map system on a user device, such as a personal computer, a mobile device, a cellular device, a tablet device, a gateway device, a kiosk, or another computing device. The interactive map system may comprise an interactive map interface, such as a graphic user interface. The interactive map system may comprise a software program, a web application, a mobile application, or a web portal, accessible by the user device, for example. At step 120, the user may provide authentication data for an authentication process. The authentication data may comprise a username, a password, an account number, a token, a key, or another identifier. The authentication data may be transmitted to a server, an endpoint, a network, or another device associated with the interactive map system.

The user may be associated with an area. The area may comprise a building, such as a residential building, a commercial building, an organizational building, a services building, or a governmental building. The area may comprise a portion of a building, such as a room of the building, a unit of the building, or a facility of the building. The area may comprise a group of buildings, such as a campus, a complex, or a neighborhood. The area may comprise an open area, such as a park, a forest, a waterway, or a roadway. The area may comprise a bounded geographical area, such as a district, town, city, county, state, or country, for example.

Figure 2:
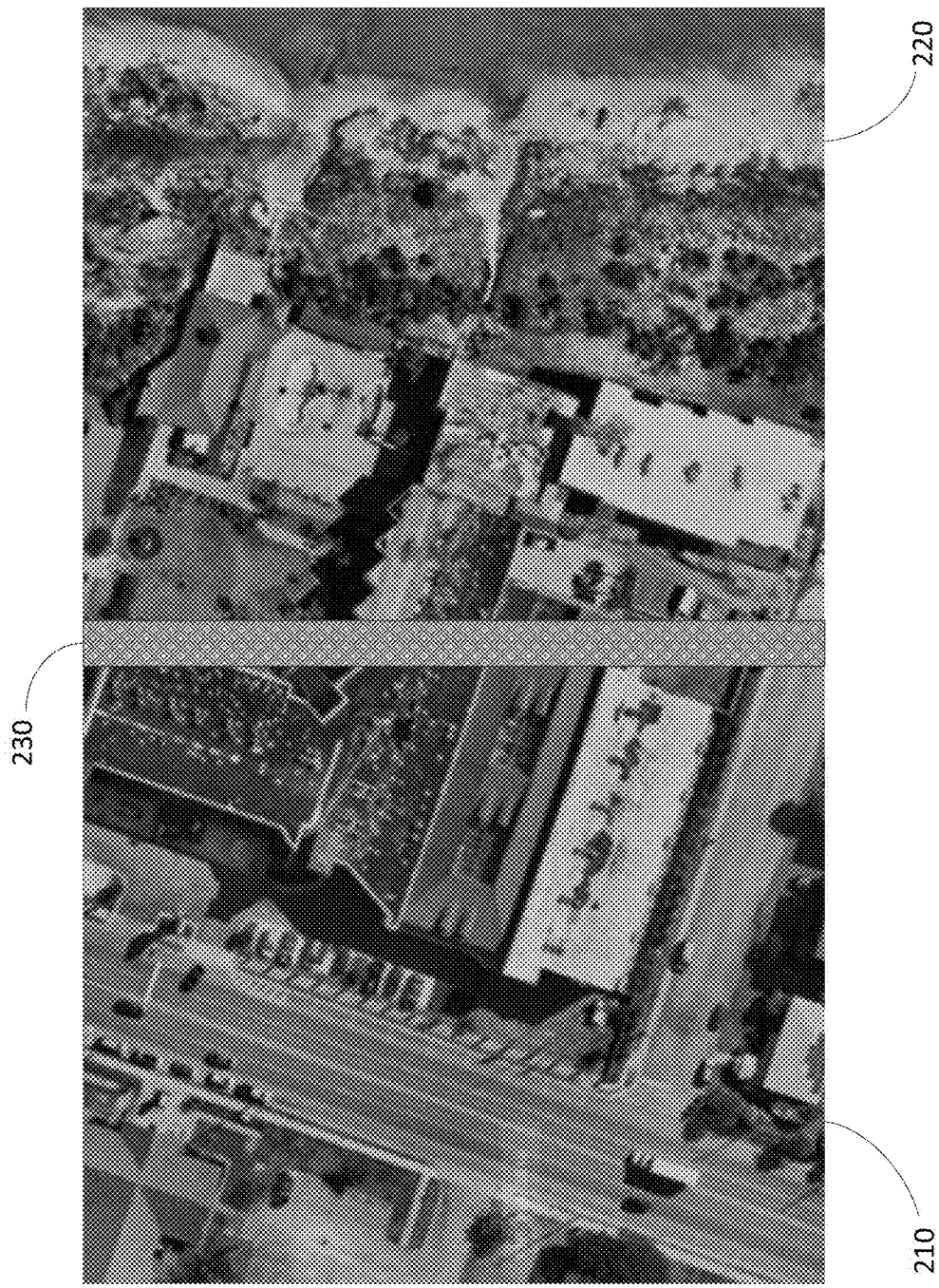
FIG. 2 shows example image data.

At step 130, using the interactive map system, the user may view an indication of data associated with the area. The data may comprise image data, such as an image of the area or a video of the area. The video may comprise live video, streamed video, or recorded video, for example. The video may comprise augmented reality, virtual reality, or mixed reality video data, for example. The image data may comprise a plurality of frames. The plurality of frames may comprise images of the area at different times. For example, as shown in FIG. 2, the image data may comprise first image data 210 and second image data 220. The first image data 210 may comprise an image of the area at a first time and the second image data 220 may comprise an image of the area at a second time. The second time may comprise a later or earlier time than the first time. The first image data 210 and the second image data 220 may be displayed such that common sections or points of the area in the images are aligned, overlapping, or are juxtaposed.

The interactive map system may comprise one or more interactive icons 230. Referencing step 140 of FIG. 1, the user may select, engage, move, or otherwise interact with the interactive icon by a user input. The user input may comprise, for example, a point, a click, or a drag, such as via the user device. The user input may comprise a voice input, a motion input, or a text input, for example. The interactive icon may be configured to cause execution of a function of the interactive map system responsive to the user input.

At step 150, the user may access data based on the interaction with the interactive icon and via the interactive map system. For example, the image data or a different view of the image data may be rendered in response to the interaction with the interactive icon. The interactive icon may enable control of a zoom function, a scroll function, a rotate function, a tilt, or a pan function of the interactive map system. As an example, the interactive icon may enable a user to alternate between an aerial view of the area and a ground view of the area. The interactive icon may enable a user to alternate between a plan view and a perspective view of the area.

The interactive icon may comprise a draggable icon. FIG. 2 shows a draggable interactive icon 230 comprising a slidable bar. However the interactive icon may comprise another shape or design. The interactive icon 230, when dragged, may cause display of a different portion of at least one of the first image data 210 and the second image data 220. Although FIG. 2 shows the interactive icon 230 rendered between at least a portion of the first image data 210 and at least a portion of the second image data 220, the interactive icon 230 may be rendered at a different position.

Responsive to a dragging of the interactive icon 230 towards the first image data 210, a greater portion of the second image data 220 may be displayed and a lesser portion of the first image data 210 may be displayed. Responsive to a dragging of the interactive icon 230 towards the first image data 210, a greater portion of the first image data 210 may be displayed and a lesser portion of the second image data 220 may be displayed. Alternatively or in addition, responsive to a dragging of the interactive icon 230 towards the first image data 210, the second image data 220 may be rendered over the first image 210 as an overlay. The second image 220 may overlay the first image 210 in a sliding motion. For example, the second image 220 may slide in a motion synchronized with or corresponding to a motion or direction of motion of the interactive icon 230 when dragged. The overlay may comprise a transparent, semi-transparent, or opaque overlay. Responsive to a dragging of the interactive icon 230 towards the second image data 220, the second image data 220 may be rolled back, revealing the first image data 210 without the overlay.

The portion of the first image data 210 that is revealed may be associated with the portion of the second image data 220 that is obscured. For example, the portion of the first image data 210 that is revealed may comprise sections of the area or points on the area and the portion of the second image data 220 that is obscured may comprise the same sections or points. The sections or points may comprise a tract, plot, coordinates, or a feature of the area, for example. Sections or points of the area in the first image data may be mapped to the sections or points in the second image data such that the sections or points are displayed on the interactive map system in same positions on the interactive map system, regardless of the current view of the image data. As an illustrative example, a section in the first image data that is indicative of a corner of a window frame may be mapped to a section in the second image data that is indicative of the corner of the window frame. As another illustrative example, a section in the first image data that is associated with coordinates 33° 47' 10.76" North, 84° 23' 1.22" West may be mapped to a section in the second image data that is associated with coordinates 33° 47' 10.76" North, 84° 23' 1.22" West. The portion of the first image data 210 that is revealed may have a size corresponding to a size of the portion of the second image data 220 that is obscured. For example, the portion of the first image data 210 that is revealed and the size of the portion of the second image data 220 that is obscured may each represent a geographic area having a size of 2 miles by 1 mile. As another example, the portion of the first image data 210 that is revealed and the size of the portion of the second image data 220 that is obscured may each have dimensions of 450 pixels by 200 pixels.

If the image data comprises video of the area, the interactive map system may comprise an interactive icon configured to enable control of a video function, such as a playback function of the video. The user may interact with the interactive icon to control playback of the video. For example the interactive icon may enable control of a play, pause, stop, rewind, trick play, rotate, pan, or tilt function of the video. If the video comprises augmented reality, virtual reality, or mixed reality video, the interactive icon may comprise an icon or an object depicted in the video.

The interactive icon may be configured to enable control of a camera device associated with the image data. For example, the user may interact with the interactive icon to operate the camera device remotely, such as by piloting or maneuvering the camera device. The user may interact with the interactive icon to change a setting of the camera device.

The user may interact with the interactive icon to view image data associated with another area. For example, the interactive map system may comprise a database of image data. Image data may be accessed from the database that is relevant to the area. The relevant image data may comprise image data associated with a condition of the area, such as a disaster or damage, image data associated with an area having a similar structure as the area, or image data associated with an area having a similar geographic location to the area, for example. As an illustrative example, if the area comprises a house in a hurricane zone, image data associated with a similar house that sustained hurricane damage may be accessed from the database and rendered via the interactive map system.

Data indicative of a status of the area or different data indicative of the status of the area may be rendered in response to the interaction with the interactive icon. The data may comprise climatic data, such as a temperature, humidity, a precipitation, and a wind speed associated with the area. The data may comprise seismic data associated with the area. The data may be associated with a status of a building, such as a state of a home automation device or a state of a security system at the building. The data may comprise an indication of an extent of damage to the area, such as a quantification of the damage. The data may comprise composite image data. The composite image data may comprise an image or video of the area. The composite image data may comprise a symbol or text over the image or video of the area. The symbol or text may be positioned at a location of the image or the video that is associated with the content or significance of the symbol or text. For example, the composite image data may comprise an image of the area with colors indicating temperatures at different points at the area. The composite image data may comprise an image of the area with a marking indicating a point of damage at the area.

Referencing step 160 of FIG. 1, the user may request, via the interactive map system, one or more services. The service may comprise a repair service. The service may comprise an emergency assistance service, such as deployment of emergency personnel or emergency supplies. The emergency supplies may be deployed using an unmanned vehicle, such as an aerial vehicle or a ground vehicle. The service may comprise an insurance service, such as a claim filing or an insurance plan. The service may comprise a communication service, such as a service that sends a notification associated with the area to a third-party or a service that establishes communication, via the interactive map system, with a third-party. The request for the service may comprise additional information, such as information associated with a timeframe for the service or an insurance policy of the user. The request for the service may comprise a request for a quote for the service. The user may receive the quote automatically via the interactive map interface. For example, the quote may be generated based on a computation analysis of the extent of the damage. The quote may be generated based at least on the additional information provided by the user.

Figure 3:
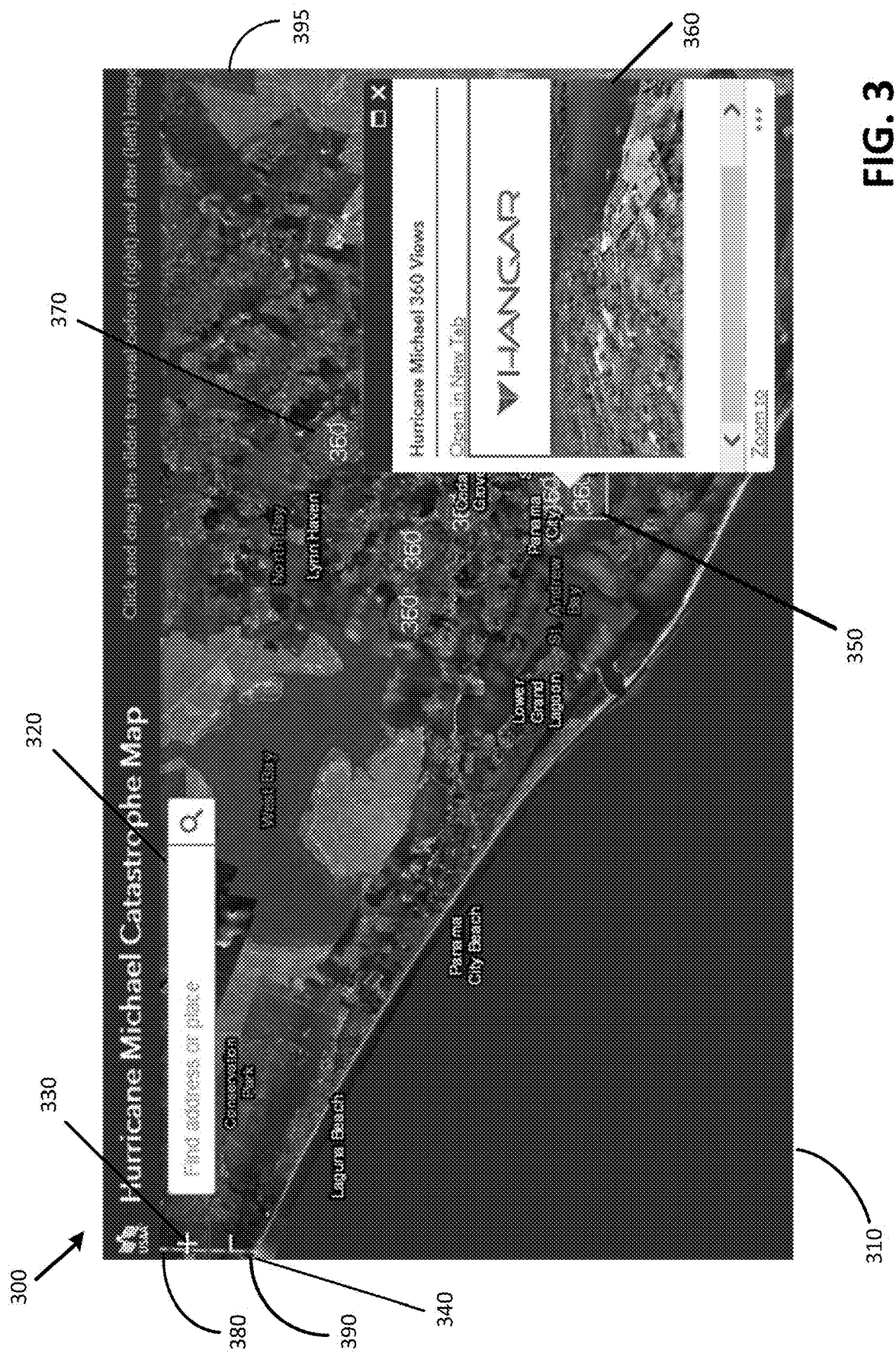
FIG. 3 shows an example user interface.

FIG. 3 shows an example interactive map interface 300. The interface 300 may comprise a graphic user interface. The interface 300 may comprise a draggable interactive icon 380 (e.g., interactive icon 230 in FIG. 2). The interactive icon 380 may be draggable or slidable. The interactive icon 380 may comprise a bar. However, the interactive icon may comprise another shape or design. The interface 300 may comprise image data 310. The image data 310 may show a map or image of a geographic region affected by an event, such as a natural disaster. The image data 310 may comprise first image data 390 and second image data 395 (e.g., first image data 210 and second image data 220 in FIG. 2). The interactive icon 380, when dragged, may cause display of a different portion of at least one of the first image data 390 and the second image data 395.

The interface 300 may comprise an address field 320 configure to receive an input indicating an address, place, or geographic location. Based on the input, the interface 300 may render display data 310 associated with the address, place, or geographic location, such as an image of the address, place, or geographic location.

The interface 300 may comprise a maximize icon 330. Based on receiving an indication of an interaction (e.g., pressing, touching, engaging) with the maximize icon 330, the interface 300 may render display data 310 showing a zoomed-in or closer view of the previously shown display data. The interface 300 may comprise a minimize icon 340. Based on receiving an indication of an interaction with the minimize icon 340, the interface 300 may render display data 310 showing a zoomed-out or wider view of the previously shown display data.

The interface 300 may comprise a viewfinder icon 350 overlaying the image data 310. The viewfinder icon 350 may comprise a square, a frame, another shape, or a combination thereof. The viewfinder icon 350 may be moved with respect to the image data 310. The interface 300 may be configured to show a three-dimensional view 360 of a region corresponding to a location of the viewfinder icon 350 on the image data. The interface 300 may be configured to present a link to a different interface, tab, page, or image that shows a three-dimensional view 360 of a region corresponding to a location of the viewfinder icon 350 on the image data. Based on The interface 300 may display target icons 370 representing locations on the image data for which three-dimensional views 360 are available. The target icons 370 may comprise circles or another shape.

Figure 4:
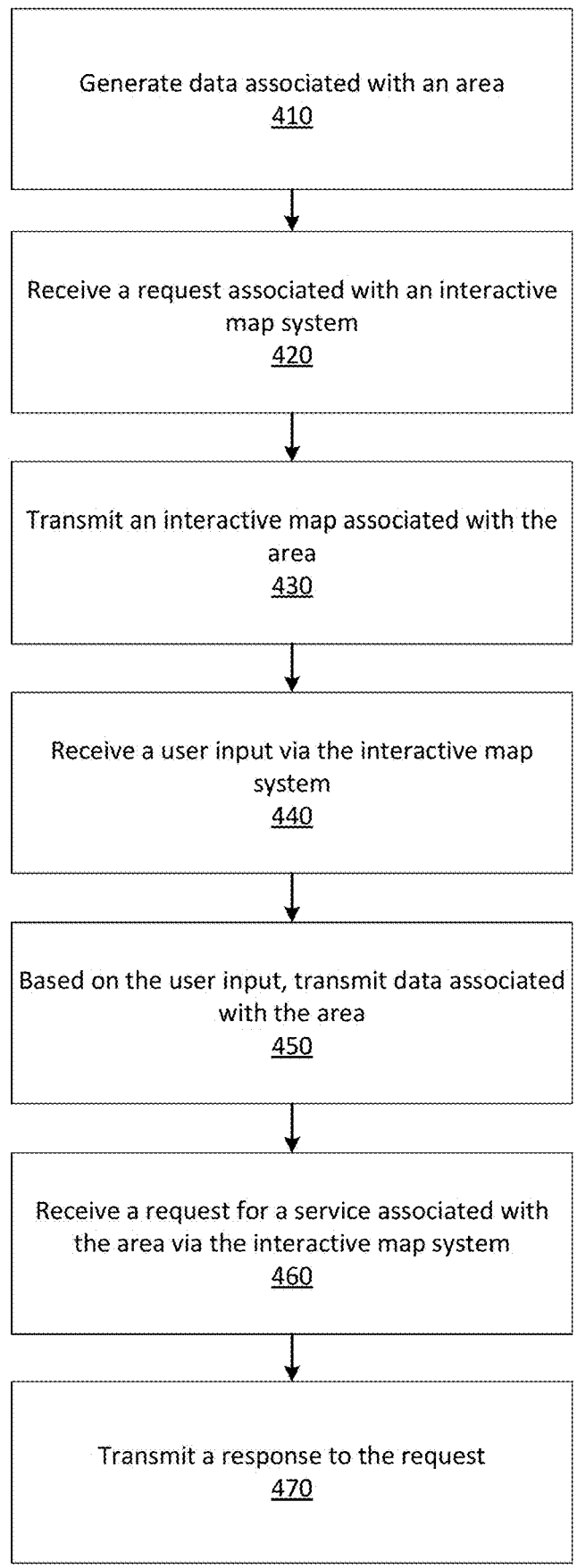
FIG. 4 shows an example method.

FIG. 4 shows a method of generating an interactive map system. At step 410, data associated with the area may be generated. Generating the data associated with the area may comprise generating the image data associated with the area. The image data may be generated using one or more camera devices. The camera device may be deployed to the area or the camera device may be stationed in a position to generate the image data. The camera device may comprise an aerial device, such as an airplane, a glider, a drone, a helicopter, or a satellite. The camera device may comprise a ground device, such as a surveillance camera, a vehicle, a user device, an Internet of Things (IoT) device, or a handheld device. The camera device may comprise a waterproof device, such as a camera configured to generate data in water or configured to move on, under, or through water. The camera device may comprise an unmanned device or vehicle, such as remotely controlled device or an autonomous device.

The camera device may capture an image or video of the area from one or more viewpoints. For example, the image data may comprise an aerial view, a ground-level view, an exterior view, or an interior view of the area. The image data may comprise visible light image data, infrared image data, multispectral image data, or water vapor image data. The image data may comprise geolocation data associated with the area. The camera device may comprise a geolocation device configured to generate the geolocation data or the geolocation data may be generated using another geolocation device. Generating the geolocation data may comprise using radio frequency (RF) geolocation or cellular triangulation, for example.

The image data may be generated using one or more computing devices. The computing device may receive the image data from the camera device. Alternatively, the computing device may comprise the camera device. The computing device may compile the image data from a plurality of camera devices to generate composite image data.

Figure 5:
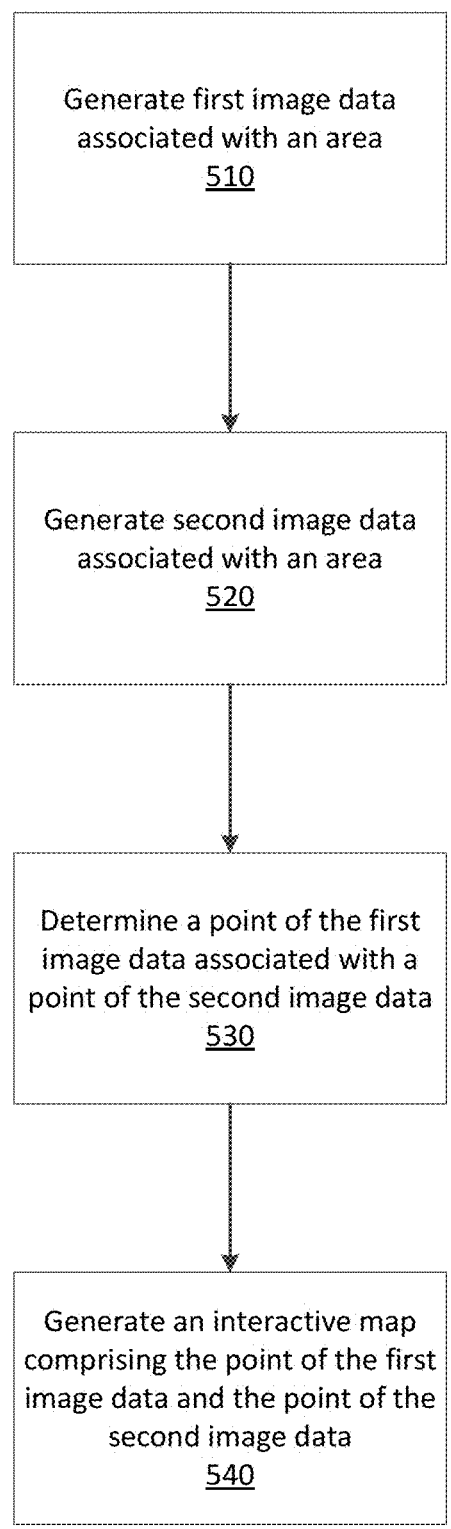
FIG. 5 shows an example method.

Generating the image data may comprise a process similar to the process shown in FIG. 5. At step 510, first image data associated with the area may be generated. The first image data (e.g., the first image data 210 in FIG. 2) may be associated with a first time. At step 520, second image data (e.g., the second image data 220 in FIG. 2) associated with the area may be generated. The second image data may be generated by a method similar to the method used to generate the first image data. The second image data may be generated by a same or different camera device or computing device that is used to generate the first image data. The second image data may comprise a same or different view of the area as the first image data. The second image data may be associated with a second time. The second time may be different than the first time, such as prior to or subsequent to the first time.

At step 530, a point or section of the first image data associated with a point or section of the second image data may be determined. The sections points may be associated with a plot, tract, feature, or coordinates in the area, for example. The points may be determined using a computing device. For example, the points may be determined by the computing device using image processing or image recognition. The image processing may use a convolutional neural network. The image processing may use computer learning to recognize structures. The image processing may use GPS data or other geolocation data. The computing device may recognize one or more positions or features in the first image data, such as based on shapes, patterns, or colors of the image data. The computing device may determine one or more positions or features in the second image data that are associated with the one or more positions or features in the first image data. For example, the computing device may determine a location of the area that is represented in the first image data and the second image data. The computing device may determine a point in the first image data and a point in the second image data at which the location is represented. The points may comprise a pixel or a group of pixels in the image data. As another illustrative example, the computing device may recognize a feature of a building, such as a roof, a wall, or a door, for example. The computing device may be taught to recognizing features or positions by a machine learning algorithm. The computing device may determine a point in the first image data and a point in the second image data at which the feature is represented.

In addition or alternatively, the points may be determined by the computing device using geographic data. The first image data and the second image data may comprise geo-location data, such as coordinates. The computing device determine a point of the first image data and a point of the second set of image data associated with a set of coordinates in the area.

Generating the data may comprise analyzing the image data. For example, the image data may be analyzed to determine damage to the area, such as digital image processing or digital image analysis. The damage to the property may be determined based on changes identified in the image data associated with the area over a period of time. A computer may be trained to determine the damage by being fed a sample comprising images of known damage and by adjusting a parameter until the computer can determine the damage with higher accuracy.

Generating the data may comprise generating a model, such as a 3D digital model, of the area. Generating the model may use the image data generated, such as aerial image data. For example, image data captured at different angles relative to the area may be used to map the area. The image data may be used to measure features of the area.

Generating the data may comprise receiving data from one or more devices or sensors located at the area. The device may comprise, for example, a home automation device, a security system device, a surveillance device, a user device, or an Internet of Things (IoT) device. The sensor may comprise, for example, a thermal sensor, a seismographic sensor, a motion sensor, a gas sensor. Determining the damage may comprise receiving data from the device or sensor and determining that the data from the sensor is consistent with or correlates with the image data.

At step 540, an interactive map associated with the area may be generated. The interactive map may comprise composite image data based on the first image data and the second image data. For example, a base layer may be generated using the first image data or the second image data. An overlay layer may be generated using the other of the first image data or the second image data. The interactive map may comprise generating composite image data in which the overlay layer displayed over the base layer. The overlay layer may be rendered on the base layer such that the point of the first image data is positioned over the point of the second image data.

Referencing step 420 in FIG. 4, after the data is generated, a request associated with the interactive map system may be received. The request may be received from a user device (e.g., the user device in step 110 in FIG. 1). The request may be received by a computing device (e.g., the computing device in step 110 in FIG. 1), a server, or a network, for example. The request may comprise a request to access the image data. The request may comprise a request for an indication of a status of the area.

The request may comprise authentication data. An authentication process may be executed to determine that the request is associated with a member or customer of a service. The authentication process may be executed to determine a level of access of the interactive map system. The authentication process may be executed to determine the area associated with the request.

At step 430, an interactive map may be transmitted. The interactive map may be transmitted based on the request and the authentication in step 420. The interactive map may be transmitted via the interactive map system. The interactive map may be transmitted by the computing device. The interactive map may be transmitted to the user device. The interactive map may comprise the image data. The interactive map may comprise the composite image data. The interactive map may comprise an interactive icon (e.g., the interactive icon in step 140 in FIG. 1 or the interactive icon 230 in FIG. 2).

The interactive map may comprise at least a portion of the first image data generated in step 510 and at least a portion of the second image data generated in step 520 of FIG. 5. For example, at least a portion of the first image data may be displayed adjacent to at least a portion of the second image data. The first image data and the second image data may be rendered such that a position of the point in the first image data is associated with a position of the point in the second image data. For example, the point in the first image data and the point in the second image data may be at a common position. As another example, the point in the first image data may be positioned adjacent to the point in the second image data. The portion of the image data displayed may be determined based on a determination of damage to the area. For example, a portion comprising an indication of the damage may be displayed.

Referencing step 440, a user input may be received (e.g., the user input in step 140 in FIG. 1). The user input may be associated with the interactive icon. The user input may be indicative of an interaction with the interactive icon. The user input may comprise, for example, a point, a click, or a drag of the interactive icon. The user input may be indicative of a request for data associated with the area. For example, the user input may be indicative of a request for a different view of the image data.

At step 450, data associated with the area may be transmitted based on the user input. The data may be transmitted via the interactive map system. The transmission of data may be in response to the interaction with the interactive icon. The image data may be transmitted in response to the interaction with the interactive icon. For example, image data associated with a time or view indicated by the user input may be transmitted. If the image data comprises video, a playback function may be executed based on the user input. For example, based on the user input, the video may be played, paused, rewound, fast-forwarded, rotated, panned, or tilted.

If the interactive icon comprises a draggable icon, a different portion of at least one of the first image data and the second image data from FIG. 5 may be rendered. Responsive to a dragging of the icon towards the first image data, a greater portion of the second image data may be displayed and a smaller portion of the first image data may be displayed. Responsive to a dragging of the icon towards the first image data, a greater portion of the first image data may be displayed and a smaller portion of the second image may be displayed. Alternatively or in addition, responsive to a dragging of the icon towards the first image data, the second image data may be rendered over the first image as an overlay. The second image may overlay the first image in a sliding motion. For example, the second image may slide in a motion corresponding to motion of the icon. The overlay may comprise a transparent, semi-transparent, or opaque overlay. Responsive to a dragging of the icon towards the second image data, the second image data may be rolled back, revealing the first image data without the overlay.

The portion of image data that is revealed, responsive to the dragging of the icon, may be associated with the portion of the image that is obscured. As an illustrative example, if the point of the first image is revealed, responsive to the dragging of the icon, the point of the second image data determined in step 530 of FIG. 5 may be obscured. If, responsive to the dragging of the icon, the second image is rendered over the first image, the point of the second image may be rendered of the point of the first image.

At step 460, a request for a service associated with the area may be received via the interactive map system. The service may comprise a repair service. The service may comprise an emergency assistance service, such as deployment of emergency personnel or emergency supplies. The emergency supplies may be deployed using an unmanned vehicle, such as an aerial vehicle or a ground vehicle. The service may comprise an insurance service, such as a claim filing or an insurance plan. The service may comprise a communication service, such as a service that sends a notification associated with the area to a third-party or a service that establishes communication, via the interactive map system, with a third-party. The request for the service may comprise additional information, such as information associated with a timeframe for the service or an insurance policy of the user. The request for the service may comprise a request for a quote for the service. A quote for the service may be determined, such as based at least on the determined damage, extend of the damage, generated measurements, generated model, or other generated data. The quote may be determined based at least on the additional information or data associated with the user or the area accessed from a database.

At step 470, a response to the request for the service may be transmitted. The response may be transmitted via the interactive map system. The response may comprise the quote. The response may comprise an indication that the service will be provided. The response may comprise further information associated with the service, such as an expected time of the service or provider of the service. The response may comprise selectable options associated with the service, such as a selection of service providers, a selection of service dates and times, and a selection of service types. A selection of one or more options may be received. In response to the request or the selection of the options, the service may be provided. For example, a human service provider or an autonomous vehicle may be deployed to the area to perform the service.

Figure 6:
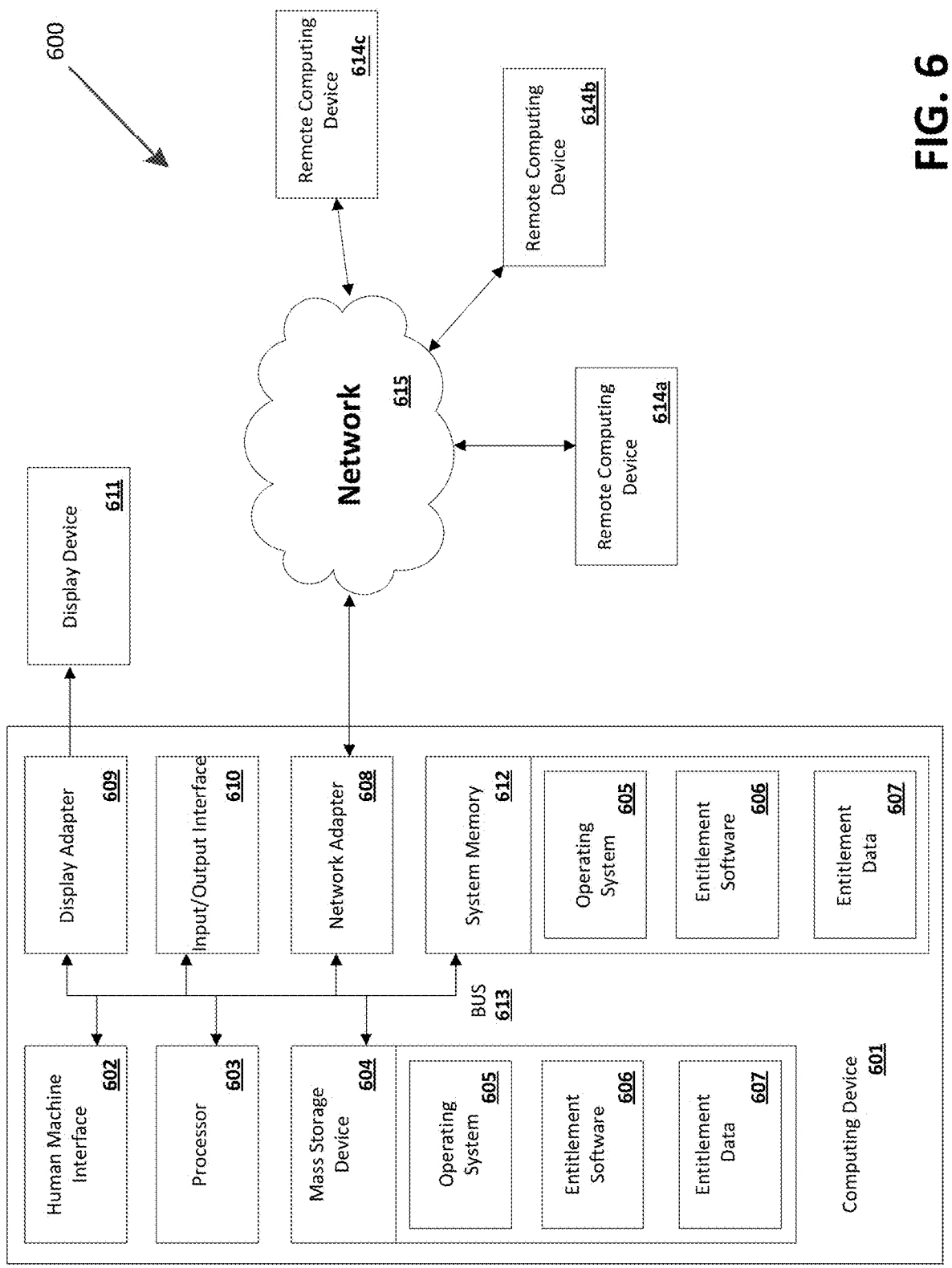
FIG. 6 shows an example computing environment.

FIG. 6 shows a block diagram illustrating an example operating environment 600 for performing the disclosed interactive map systems and methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, the systems and methods disclosed herein may be implemented via a computing device 601. The components of the computing device 601 may comprise, but are not limited to, one or more processors or processing units 603, a system memory 612, and a system bus 613 that couples various system components including the processor 603 to the system memory 612. In the case of multiple processing units 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired or wireless network connection and each of the subsystems, including the processor 603, a mass storage device 604, an operating system 605, entitlement software 606, entitlement data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 typically comprises a variety of computer readable media. Exemplary readable media may be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), or non-volatile memory, such as read only memory (ROM). The system memory 612 typically contains data such as entitlement data 607 or program modules such as operating system 605 and entitlement software 606 that are immediately accessible to or are presently operated on by the processing unit 603.

In another aspect, the computing device 601 may also comprise other removable/non-removable, volatile/non-volatile computer storage media. By way of example, FIG. 6 illustrates a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, an operating system 605 and entitlement software 606. Each of the operating system 605 and entitlement software 606 (or some combination thereof) may comprise elements of the programming and the entitlement software 606. Entitlement data 607 may also be stored on the mass storage device 604. Entitlement data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

In yet another aspect, a display device 611 may also be connected to the system bus 613 via an interface, such as a display adapter 609. It is contemplated that the computing device 601 may have more than one display adapter 609 and the computer 601 may have more than one display device 611. For example, a display device may be a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614a,b,c. By way of example, a remote computing device may be a personal computer, portable computer, a smart phone, a server, a router, a network computer, a peer device or other common network node, and so on. Logical connections between the computing device 601 and a remote computing device 614a,b,c may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of entitlement software 606 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed:

1. A method comprising:
    generating first image data associated with an area at a first time;
    generating second image data associated with the area at a second time, wherein the second time is different than the first time;
    determining, using image processing, a section of the first image data associated with a section of the second image data;
    generating an interactive map comprising at least a portion of the first image data and at least a portion of the second image data, wherein the interactive map comprises an interactive icon;
    causing output of the interactive map, wherein the section of the first image data is output at a position on the interactive map corresponding to a position of the section of the second image data on the interactive map;
    receiving, via the interactive map, a user input indicative of an interaction with the interactive icon; and
    causing output, based on the user input and via the interactive map, of a different portion of at least one of the first image data and the second image data.

2. The method of claim 1, wherein the interactive icon comprises a bar.

3. The method of claim 2, wherein the bar is rendered between the at least portion of the first image data and the at least portion of the second image data on the interactive map.

4. The method of claim 1, wherein the area comprises at least one of a portion of a building, a plurality of buildings, a roadway, a waterway, a park, and a forest.

5. The method of claim 1, wherein the section of the first image data and the section of the second image data comprise an indication of a feature of the area.

6. The method of claim 1, wherein the different portion of at least one of the first image data and the second image data comprises causing at least a part of the second image data overlaid on at least a part of the first image data.

7. The method of claim 1, wherein the different portion of at least one of the first image data and the second image data comprises a greater portion of the first image data and a smaller portion of the second image data.

8. The method of claim 1, wherein the interaction with the interactive icon comprises a dragging of the interactive icon.

9. The method of claim 8, wherein the causing output of the different portion of the at least one of the first image data and the second image data comprises causing part of at least one of the first image data and the second image data to slide across the interactive map.

10. The method of claim 9, wherein the causing the part of at least one of the first image data and the second image data to slide across the interactive map comprises causing the part of the at least one of the first image data and the second image data to slide across the interactive map in tandem with the dragging of the interactive icon.

11. The method of claim 1, wherein the causing output of the different portion of the at least one of the first image data and the second image data comprises revealing at least a part of the first image data and obscuring at least a part of the second image data, wherein the at least part of the first image data is associated with the at least part of the second image data.

12. The method of claim 11, wherein the at least part of the first image data comprises the section of the first image data associated with the second image data;
    and wherein the at least part of the second image data comprises the section of the second image data.

13. A method comprising
    displaying, by a user device, an interactive map interface comprising an interactive icon, first image data associated with an area at a first time, and second image data associated with the area at a second time different than the first time;
    receiving, via the interactive map interface, an input indicating a movement of the interactive icon; and
    displaying, via the interactive map interface, a dynamically modified view of the first image data and the second image data, wherein a portion of the second image data is revealed and a portion of the first image data is obscured in a direction of the movement of the interaction icon when the interactive icon is moved in a first direction, and wherein the portion of the second image data is obscured and the portion of the first image data is revealed in the direction of the movement of the interactive icon when the interactive icon is moved in a second direction.

14. The method of claim 13, wherein the method further comprises receiving, via the interactive map interface, an indication of data from a sensor device located at the area.

15. The method of claim 13, wherein the portion of the first image data and the portion of the second image data comprise a common point in the area.

16. The method of claim 13, wherein a size of the portion of the second image data that is revealed corresponds to the size of the portion of the first image data that is obscured.

17. A device comprising:
    one or more processors; and
    memory storing instructions that, when executed by the one or more processors, cause the device to:
        generate first image data associated with an area at a first time;
        generate second image data associated with the area at a second time, wherein the second time is different than the first time;
        determine, using image processing, a section of the first image data associated with a section of the second image data;
        cause display, via an interactive map interface, of a first portion of the first image data and a first portion of the second image data, wherein the first portion of the first image data comprises the section of the first image data, wherein the first portion of the second image data does not comprise the section of the second image data wherein the interactive map interface comprises an interactive icon;
        receive via the interactive map interface, a user input indicative of an interaction with the interactive icon; and
        cause display based on the user input and via the interactive map interface, of a second portion of the first image data and a second portion of the second image data, wherein the second portion of the first image data does not comprise the section of the first image data, and wherein the second portion of the second image data comprises the section of the second image data.

18. The device of claim 17, wherein the interactive map interface is output via a mobile device.

19. The device of claim 17, wherein the interactive icon comprises a slidable bar.

20. The device of claim 17, wherein a size of the second portion of the second image data that is displayed corresponds to a size of a portion of the first image that is obscured.

* * * * *